United States Patent [19]
Olesen et al.

[11] Patent Number: 5,278,224
[45] Date of Patent: Jan. 11, 1994

[54] RESIN SYSTEMS OF IMPROVED TOUGHNESS AND HIGH TEMPERATURE PERFORMANCE AND METHOD THEREFOR

[75] Inventors: Karen A. Olesen, Pleasanton; Robert A. Buyny, Clayton, both of Calif.

[73] Assignee: Hexcel Corporation, Dublin, Calif.

[21] Appl. No.: 744,562

[22] Filed: Aug. 13, 1991

Related U.S. Application Data

[63] Continuation-in-part of Ser. No. 312,016, Feb. 16, 1989, Pat. No. 5,248,711.

[51] Int. Cl.$^5$ ............................................. C08L 77/00
[52] U.S. Cl. ..................................... 524/538; 524/539; 523/500; 523/527
[58] Field of Search ................ 524/538, 539; 523/500, 523/527

[56] References Cited

FOREIGN PATENT DOCUMENTS 0274899 6/1988 European Pat. Off. ......... C08J 5/24
0296112 12/1988 European Pat. Off. ...... C08L 79/08

*Primary Examiner*—Paul R. Michl
*Assistant Examiner*—Edward Cain
*Attorney, Agent, or Firm*—Townsend and Townsend Khourie and Crew

[57] ABSTRACT

This disclosure addresses resin systems which contain thermosetting materials and thermoplastic modifiers, the resin systems being formed by dispersing particles of thermoplastic solids in the thermosetting materials, the particles being soluble in the resins at temperatures below the resin system gelation temperature. According to this disclosure, the systems are improved by the use of a blend of two types of thermoplastic material—a high glass transition temperature thermoplastic such as a poly(benzophenone-imide) and a high toughness thermoplastic such as a poly(ether-imide). By appropriate adjustment of the relative amounts of these two thermoplastics, resin system properties such as toughness, service temperature, thermal stability and solvent resistance can be adjusted to optimum levels.

61 Claims, No Drawings

RESIN SYSTEMS OF IMPROVED TOUGHNESS AND HIGH TEMPERATURE PERFORMANCE AND METHOD THEREFOR

CROSS REFERENCE TO RELATED APPLICATION

This application is a continuation-in-part of application Ser. No. 07/312,016, filed Feb. 16, 1989 now U.S. Pat. No. 5,248,711.

BACKGROUND AND SUMMARY OF THE INVENTION

Thermosetting resins are widely used in the formation of fiber-reinforced structural materials due to their ability to withstand high temperatures. These materials provide the high strength and high temperature capability needed in such applications as military aircraft.

Thermosetting resins which have been used in this context include epoxy resins and bismaleimide resins. The latter are particularly beneficial due to their high glass transition temperature, their high capability of withstanding hot wet environments, and their low smoke and toxicant emission.

The beneficial properties of thermosetting resins are unfortunately offset by a brittleness or low toughness resulting in low damage tolerance. Toughness is extremely important in high-performance structures, since high loads must be borne both within the plane of the composite and in directions normal to the plane of the composite. Among the solutions offered for increasing toughness are the use of thermoplastics in combination with the thermosetting resins. This usually occurs, however, at the expense of processability, the thermoplastic additive causing an increase in the viscosity and the softening point of the material.

Patent application Ser. No. 07/312,016, filed Feb. 16, 1989, discloses resins made from a continuous phase of thermosetting resin containing a dispersed phase of thermoplastic material, the thermoplastic material being one which is solid at ambient temperatures but which dissolves in the thermosetting resin at a temperature below the gelation temperature of the thermosetting resin. The term "gelation temperature" as used herein refers to the temperature at which gelation occurs in the normal heat processing of the resin to achieve a thermal cure, as distinguished from any gelation which might occur very slowly at lower temperatures or during storage.

According to the present invention, the thermoplastic particles in the procedure of patent application Ser. No. 07/312,016 are replaced by particles which are a single-phase blend of at least two thermoplastics from at least two distinct classes. It has indeed been discovered that the resin which results when these particles are dispersed in a matrix of thermosetting polymer and then cured has unique properties in terms of toughness, processability, utility at high temperatures and other performance and use characteristics.

The blend is a mutually compatible combination of thermoplastics, at least one from each of the following two classes of thermoplastics:

(i) a thermoplastic polymer with a glass transition temperature ($T_g$) of at least about 250° C., and (ii) a thermoplastic polymer with a fracture toughness of at least about 2.5 ksi $\sqrt{in}$, and a glass transition temperature of less than about 240° C. These values of $T_g$ represent the polymer species when molded individually, although this is not the form which they assume either in the particles or in the final product.

As used herein, the term "compatible" designates species which are miscible such that when combined, these species form a single homogeneous phase. The term "blend" designates a combination of the species, such that any single particle of the blend contains both species intimately mixed together in a single homogeneous solid phase, in contrast to mixtures of particles where each particle contains only one such species. The blends herein are thus analogous to alloys in the metallurgical context.

In contrast, the combination formed by first combining the thermoplastic blend particles with the fluid thermosetting resin precursor and then curing the combination at elevated temperature is not homogeneous. The cured combination instead exhibits a two-phase morphology, one such phase rich in thermoplastic material and the other rich in thermoset material. As will be explained below, the phases are often inverted upon cure, the dispersed phase being the phase rich in thermosetting material and the continuous phase being the phase rich in thermoplastic material.

The term "composite" is used herein to denote the combination of the two-phase thermosetting/thermoplastic resin and reinforcing material coated or impregnated with the resin.

Critical to this invention is the inclusion of at least one thermoplastic species from each of the two classes designated above. The present invention further extends, however, to the inclusion of additional thermoplastics compatible with these two, the additional thermoplastics either falling within one of the two classes or falling outside both. In these cases, the thermoplastic blend is a combination of three or more species. In preferred embodiments of the invention, however, the combination is limited to one from each of the two classes designated above.

It has further been discovered that by varying the weight ratio of the two thermoplastic components in the particles, one can control the properties of the final thermosetting/thermoplastic resin which is formed when the particles are combined with the thermosetting material precursor and the entire combination is cured. This is a further unexpected feature, not predictable from the known qualities of these resins, since it permits one to tailor the properties of the final resin to specific needs and performance requirements by adjustment of the relative amounts of the thermoplastic components alone. It is particularly surprising and nonobvious that the thermoplastics, when combined in the blend, yield a composite which displays a balance of properties far superior to those of the individual components standing alone.

Other features, advantages and further aspects of the invention will be apparent from the description which follows. The overall resin finds utility both as an adhesive and as the resin component in structural composites.

DETAILED DESCRIPTION OF THE INVENTION AND PREFERRED EMBODIMENTS

Within the generic scope of each of the two classes of thermoplastics used in accordance with this invention, certain subclasses are preferred.

A preferred subclass of class (i) above are those thermoplastics with $T_g$ of about 280° C. or above. A further preferred subclass are those with $T_g$ of about 300° C. or above. A preferred subclass of class (ii) are those with a toughness of about 2.75 ksi √in or greater. A further preferred subclass of class (ii) are those with $T_g$ of about 220° C. or below. For both classes, amorphous materials are preferred.

Thermoplastics meeting these criteria may be selected from a wide range of materials. Examples are polyamides, polyimides, polyamide-imides, polyarylates, polyaryletherketones, polyaryl sulfones, polybenzimidazoles, polycarbonates, polyether-imides, polysulfones and polyether sulfones. Selection will be made on the basis of the $T_g$ and toughness specifications enumerated above as well as the requirement that the selected pair be mutually compatible.

One illustrative subclass of the high $T_g$ thermoplastic

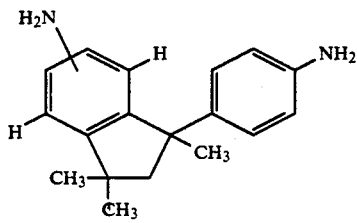

A more narrowly defined illustrative subclass of the high toughness material are poly(ether-imide)s formed by the reaction between a diaminobenzene and a dianhydride ether. Dianhydride diethers are the preferred dianhydride ethers. Preferred dianhydride diethers are bis-1,3-isobenzofurandione diethers. A particularly preferred bis-1,3-isobenzofurandione diether is one having the formula

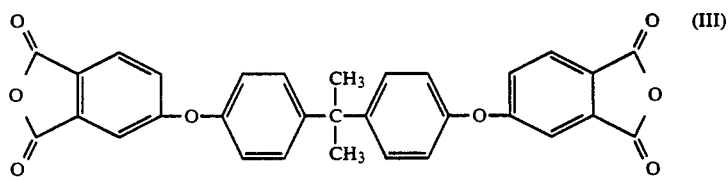

(class (i) above) are poly(benzophenoneimide)s. Likewise, an illustrative subclass of the high toughness thermoplastic (class (ii) above) are poly(etherimide)s. Alternatively, a preferred subclass from which both the high $T_g$ and the high toughness thermoplastics may be selected are reaction products of an aromatic diamine compound and bis-1,3-isobenzofurandione compound.

A more narrowly defined illustrative subclass of the high $T_g$ thermoplastic are poly(benzophenone-imide)s formed from the reaction of benzophenonetetracarboxylic dianhydride and a diamine. Benzophenonetetracarboxylic dianhydride has the following formula

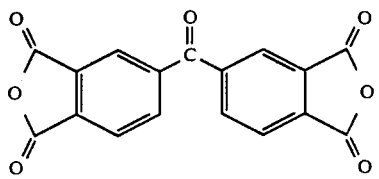

A preferred diamine for this reaction is 5(6)-amino-1-(4'-aminophenyl-1,1,3-trimethylindane, having the formula A preferred diaminobenzene for use in the reaction is metadiaminobenzene (1,3-diaminobenzene). The structure of the reaction product of the 1,3-isobenzofurandione diether of formula (III) and 1,3-diaminobenzene is

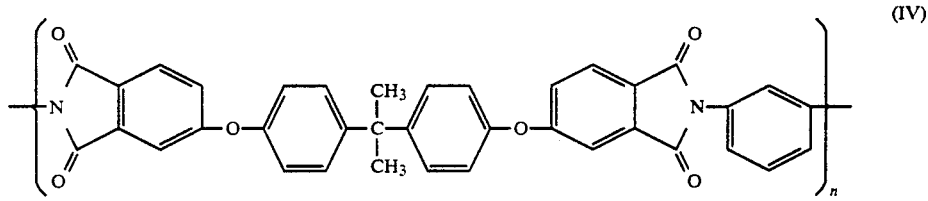

As indicated above, the properties of the composite can be tailored to specific needs by varying the weight ratio of the two thermoplastic components in the particles used in the compounding of the resin prior to cure. Among the properties which can be controlled in this manner are the service temperature (i.e., the highest temperature at which the composite can be effectively used), fracture toughness, solvent resistance and processability. For the preferred structures indicated above, for example, a higher service temperature can be achieved by higher amounts of the poly(benzophenone-imide). Greater toughness, on the other hand, is achievable by increasing the proportion of the poly(ether-imide). other variations and dependencies are readily determinable by routine experimentation. However, in most applications, best results will be achieved with combinations in which the weight ratio of poly(benzophenone-imide) to poly(ether-imide) is from about 0.3:1 to about 3:1, with a range of about 0.5:1 to about 2:1 particularly preferred.

The solid particles of blended thermoplastic material bear a variety of physical characteristics which can be used to further modulate the procedure for forming the final product as well as its character. For example, the size, density and other physical characteristics of the particles may be varied to control their solubilization characteristics, notably the speed of solubilization and the effective solubilization temperature as well.

A particularly effective method for forming the particles is that of emulsion/evaporation. According to this technique, the thermoplastic components are first dissolved together in a suitable solvent. The resulting solution is then dispersed through a liquid phase in which the thermoplastics are not soluble and which is less than fully miscible with the solvent. The dispersion is then agitated to produce droplets of the desired size, then heated to evaporate the solvent, causing the thermoplastics to solidify in the form of particles of a narrow size range and relatively dense nature. Such particles are homogeneous blends of the two thermoplastics and will generally exhibit a narrow solubilization temperature range in the thermosetting resin.

For most applications, particles having a size less than about 100 microns in diameter will provide the best results. Particles of about 2 microns to about 50 microns in diameter, particularly those of about 10 microns to about 40 microns in diameter, are preferred.

In composite applications, in particular fiber-reinforced laminates where microcracking is a major concern and where intralaminar toughness is of prime importance, thermoplastic particles which solubilize at a temperature well below the gelation or mold temperature of the entire resin (particles plus continuous thermosetting phase) are preferred. Solubilization will generally occur throughout a range of temperatures, and the upper limit of the range for this type of application will typically be about 50 to 100 degrees F. (28-56 degrees C.) below the gelation temperature of the resin.

For fiber-reinforced laminate applications where interlaminar toughness is of prime importance, particles solubilizing at a higher temperature, such as above 50 degrees F. (28 degrees C.) below the gelation temperature of the resin, are preferred. These are applications where the composite is likely to be subject to impact damage from foreign objects. This type of thermoplastic will tend to be more concentrated in regions adjacent to the surface of each ply of the laminate. The upper limit of the solubilization temperature range for these applications may be within about 10 degrees F. (6 degrees C.) of, if not the same as, the gelation temperature.

The thermosetting resin itself may be any of a wide range of species. Preferred thermosetting resins are those having gelation temperatures ranging from about 300° F. to about 400+ F. (149°-204° C.).

Preferred thermosetting resins are bismaleimide-based resin systems. Co-reactants for use with the bismaleimides may include any of a wide variety of unsaturated organic compounds, particularly those having multiple unsaturation, either ethylenic, acetylenic or both. Examples are acrylic acids and amides and the associated esters, such as acrylic acid, methacrylic acid, methylmethacrylate, acrylamide and methacrylamide. Further examples are dicyanoethylene, tetracyanoethylene, allyl alcohol, 2,2'-diallylbisphenol A, 2,2'-dipropenylbisphenol A, diallylphthalate, triallylisocyanurate, triallylcyanurate, N-vinyl-2-pyrrolidinone, N-vinyl caprolactam, ethylene glycol dimethacrylate, diethylene glycol dimethacrylate, trimethylolpropane triacrylate, trimethylolpropane trimethacrylate, pentaerythritol tetramethacrylate, 4-allyl-2-methoxyphenol, triallyl trimellitate, divinyl benzene, dicyclopentadienyl acrylate, dicyclopentadienyloxyethyl acrylate, 1,4-butanediol divinyl ether, 1,4-dihydroxy-2-butene, styrene, $\alpha$-methyl styrene, chlorostyrene, p-phenylstyrene, p-methylstyrene, t-butylstyrene, and phenyl vinyl ether. Of particular interest are resin systems employing a bismaleimide in combination with a bis(alkenylphenol). Descriptions of a typical resin system of this type are found in Zahir, et al., U.S. Pat. No. 4,100,140, issued Jul. 11, 1978, incorporated herein by reference. Particularly preferred components are 4,4'-bismaleimidodiphenylmethane and o,o'-diallyl bisphenol A.

Other ingredients will generally be included among the thermosetting resin components in accordance with conventional technology well known among those skilled in the art of processing such materials. These ingredients include, for example, curing agents, processing aids and the like. The relative proportions of all such components, including the comonomers, are further in accordance with the conventional technology.

The combination of thermosetting material and thermoplastic blend according to this invention has certain preferred characteristics. For example, the solubility parameters, $\delta$, of both the thermosetting material and the thermoplastic blend preferably fall within about 2 $(cal/cc)^{\frac{1}{2}}$ of each other. In further preferred embodiments, the solubility parameters will both fall within the range of about 10 to about 12 $(cal/cc)^{\frac{1}{2}}$. In still further preferred embodiments, the glass transition temperatures of the thermosetting material and the thermoplastic blend will be comparable, and in the most preferred embodiments the glass transition temperature of the thermoplastic blend will be no more than 20 degrees C. below that of the fully cured thermosetting material.

The relative amounts of thermoplastic and thermosetting components may vary, depending on the qualities sought for the final composite. In most applications, about 2 to about 100 parts by weight of thermoplastic blend per 100 parts by weight of thermosetting material will provide the best results. A preferred range is about 10 to about 40 parts per 100 parts.

The compositions of the present invention are used in the formation of "prepregs" (fiber networks preimpregnated with resin) and cured composites according to conventional techniques. Typically, the resin composition is first prepared by mixing the thermosetting ingredients and adding the thermoplastic particles, which are mixed in with the thermosetting ingredients to form a uniform dispersion. The composition is then fed concurrently with the fiber network which is in the form of fiber strands, mat, tape, yarn or cloth, through a series of heated pressure rollers, using temperatures and pressures selected as appropriate for the particular fibers and resin composition, which is within the routine skill of those skilled in the art. Other techniques involve drawing the fiber network through a dip tank containing the resin composition in the form of a dispersion, followed by evaporation of the dispersing medium. Again, the selection of the dispersing medium is within the routine skill of the art. A further alternative is by infusion, wherein the resin composition may be applied as a thick film to a woven fabric fiber network.

The combination of dispersed thermoplastic resin and continuous thermosetting resin described herein also finds utility as an adhesive, without the inclusion of the fiber matrix described above. As such, the composition may be applied to the various methods and applications used for adhesives in general, and these will be known to those skilled in the art.

The resin compositions may be cured and formed into structural elements in conventional ways. Examples are the use of laminating presses, vacuum and pressure bag molding, and autoclaves. Multilayered elements are particularly useful in many cases, since such arrangements permit the use of combinations of layers varying in resin composition, fiber type and content and the various other parameters that define the composite, thereby permitting one to select among a wide range of physical, chemical and thermal properties.

The following examples are offered by way of illustration, and are intended neither to limit nor to define the invention in any manner.

EXAMPLES

A series of resins were prepared from the following components, varying in the amounts of the thermoplastic components as indicated:

TABLE 1

Materials

| Component no. | Parts by Weight | Material | Supplier |
|---|---|---|---|
| (1) | 80.0 | Matrimid 5292 Component A (4,4'-bismaleimido-diphenylmethane) | Ciba-Geigy |
| (2) | 61.5 | Matrimid 5292 Component B (o.o'-diallyl bisphenol A) | Ciba-Geigy |
| (3) | 20.0 | HVA-2 (N,N'-m-phenylene-dimaleimide) | DuPont |
| (4) | varied* | Matrimid 5218 (polyimide of benzo-phenonetetracarboxylic dianhydride and 5(6)-amin-1-(4'-amino-phenyl)-1,3,3-trimethylindane polyimide). Glass transition temperature when molded: 320° C. | Ciba-Geigy |
| (5) | varied* | Ultem 1000 (Formula IV above). Glass transition temperature when molded: 210° C. | General Electric |

*Total of components (4) and (5) = 40.5.

The composition of the Matrimid 5218 was such that it would dissolve in the thermosetting resin components within a temperature range of 140°-180° C. (284°-356° F.) when measured by the dissolution exotherm of a DSC trace taken at 10° C./min. The composition of the Ulten 1000 was such that it would dissolve within a temperature range of 120°-150° C. (248°-302° F.) when measured in the same manner, and had a weight average molecular weight of 30,000±10,000, and a number average molecular weight of 12,000±4,000. The solubility parameter of the uncured resin (components (1), (2) and (3)), calculated by the method of Hoy (The Polymer Handbook, 2d ed.) was 11.9 (cal/cc)$^{\frac{1}{2}}$ while that of the Matrimid 5218 was 11.1 (cal/cc)$^{\frac{1}{2}}$.

The thermoplastic components (4) and (5) were formed into particles by first dissolving the thermoplastics in methylene chloride. For those composites where only one of the two thermoplastics was used, the solution contained only that one species. For those where the two thermoplastics were combined, both were dissolved in the same solution at the specified proportion. In either case, the weight percent of total thermoplastics in the solution was 13%. The solution thus formed was combined with an aqueous solution of 0.25% polyvinylalcohol and 2.1% glycerine (surfactants), and the two immiscible liquids were placed in a mix vessel temperature-controlled by a heat exchange fluid. The polyvinylalcohol had a weight average molecular weight of 130,000 to 180,000 and a hydrolysis level of 87.0% to 89.0%. The volumetric ratio of the organic solution to the aqueous solution was 1:2.

The two-phase mixture was agitated in the mix vessel under a partial vacuum of 2 to 10 inches of mercury, and with the temperature of the heat exchange fluid raised and maintained three degrees Celsius above the temperature of the organic and aqueous phases. By controlling the vacuum and temperature differential at these levels, foam formation was avoided. When the temperature in the mixing liquid reached 45° C., the mixer contents were heated to 50° C., held at that temperature for one hour, then cooled. The result was a slurry of thermoplastic microspheres, which was filtered, resuspended in water, and refiltered. The resulting filter cake was oven dried at 90°-120° C., broken up and the particles were size classified.

The relative amounts of the thermoplastic components (4) and (5) in the microspheres formed by this technique were 0:1, 1:2, 1:1, 2:1 and 1:0 (by weight), with a particle size of approximately 10–40 microns in diameter.

The resin with the thermoplastic particles dispersed in it was prepared as follows. Components (1) and (3) were combined with component (2), which was liquid, while maintaining the mix temperature at 120°-140° F. (49°-60C). Once these components were combined, the temperature was increased to 240° F. (116° C.) and held at that temperature for 30 minutes. The mixture was then cooled to 200° F. (93° C.) and the thermoplastic particles were added and completely dispersed.

The mixture was then cast into resin films, approximately 1 mil in thickness, on release paper at 200° F. (93° C.), using a reverse roll film caster. One of these films was then placed on each side of a 0.003-inch (0.0076-cm) thick sheet of collimated Hercules IM7 graphite fibers in a sandwich-type arrangement. The sandwich was then rolled between counter-rotating pressure rolls heated to 200° F. (93° C.) to form a unidirectional graphite fiber tape.

Laminates made from the tapes were then cured for four hours at 375° F. (191° C.), then post cured for 16 hours at 450° F. (232° C.). The cured products exhibited a uniform laminate microstructure, as observed by photomicrograph of a cross section, with full and uniform penetration of the cured resins into the fiber matrix. A scanning electron microscopy photomicrograph showed the resin itself as a two-phase composition, one phase consisting of discrete domains measuring 0.5 to 5 microns in diameter and the other phase being the continuous domain in which the discrete domains were dispersed. By appropriate tests on cured resin of the same composition without the fibers, it was determined that the curing had caused phase inversion such that the discrete domains were rich in the thermosetting material while the continuous domain was rich in the thermoplastic material.

Glass transition temperatures ($T_g$) of the composites were then determined, using dynamic mechanical thermal analysis (DMTA) to determine the maximum value of the loss modulus factor $E''$. Toughness tests were also performed on the cured product using the General Dynamics Standard Test for Advanced Composites B-201 (edge delamination test) and Boeing Standard Method BSS 7260, Class 2 (compression-after-impact test). Test results are listed in Table 2, in which $T_g$ is given in degrees Celsius; the edge delamination strength (EDS) represents the first crack stress taken with ply orientations of $((\pm 25)_2, 90)_s$ on $0.75 \times 11$ in. coupons; and the compression-after-impact (CAI) was taken with ply orientations of $(45, 0, -45, 90)_{4s}$ on $4 \times 6$ in. coupons at an impact level of 1,500 inch-pounds per inch. Units are given below the table. The table also includes $T_g$ values for molded thermoplastics (in the absence of the thermoset resin) for comparison, in various combinations ranging from 100% Matrimid 5218 to 100% Ultem 1000.

TABLE 2

Test Results

| (4):(5) Ratio | $T_g$ dry/wet | EDS | CAI: stress/ modulus/strain | Damage Area |
|---|---|---|---|---|
| | | Composites: | | |
| 0:1 | 205/190 | 42.3 | 46.3/7.3/6884 | 1.38 ± 0.03 |
| 1:2 | 240/201 | 38.0 | 40.9/7.5/5385 | 1.40 ± 0.12 |
| | | 39.2 | 42.2/7.1/6189 | 1.67 ± 0.05 |
| 1:1 | 250/208 | 37.9 | 42.0/7.5/6009 | 1.50 ± 0.21 |
| | | | 41.6/7.4/5819 | 130 ± 0.01 |
| 2:1 | 259/210 | 37.6 | 40.9/7.0/6137 | 1.49 ± 0.10 |
| 1:0 | 260/210 | 35.0 | 34.2/7.1/5069 | 2.30 ± 0.40 |
| | | Molded thermoplastics: | | |
| 0:1 | 198/— | | | |
| 1:2 | 224/— | | | |
| 1:1 | 237/— | | | |
| 2:1 | 260/— | | | |
| 1:0 | 310/— | | | |

$T_g$ = glass transition temperature, °C.
"dry": unconditioned
"wet": conditioned by immersion in boiling water for 96 hours
EDS = edge delamination strength. ksi
CAI = compression after impact, KSI (stress), MSI (modulus), and microinches per inch (strain)
Damage area: square inches Fracture toughness tests were performed on cured resins. For the resins used in these tests, the amount of components (1), (2) and (3) together equaled the amount of the combination of components (4) and (5) in parts by weight. The weight ratio of thermoplastic to thermosetting components was thus 1:1. The property measured was plane-strain fracture toughness, K1c, measured by a compact tension procedure according to ASTM E399-83 A4. The results are shown in Table 3, which also includes the results of the same tests performed on the molded thermoplastics of 100% Matrimid 5218 and 100% Ulten 1000, for comparison.

TABLE 3

Further Test Results

| Thermoplastic Blend Ratio (4):(5) | K1c Fracture Toughness (ksi $\sqrt{in}$) |
|---|---|
| Cured Neat Resins (1:1 Thermoplastic:Thermosetting): | |
| 0:1 | 2.78 ± 0.43 |
| 1:2 | 2.25 ± 0.13 |
| 1:1 | 2.07 ± 0.13 |
| 2:1 | 1.93 ± 0.24 |
| 1:0 | 1.63 ± 0.09 |
| Molded Thermoplastics: | |
| 0:1 | 3.05 ± 0.20 |
| 1:0 | 1.78 ± 0.20 |

It is clear from these tests results that one can readily select and obtain a desired level of any of these performance parameters by an appropriate blend of the two thermoplastic components.

The foregoing is offered primarily for purposes of illustration. It will be readily apparent to those skilled int eh art that modifications, variations, additions and substitutions in the materials and methods disclosed herein may be made, without departing from the spirit and scope of the invention, with the expectation that comparable results or results predictable from such changes will be achieved.

What is claimed is:

1. A curable resin comprising:
   a thermosetting substance in fluid form formed by combining thermosetting reactants at a mixing temperature, which thermosetting substance forms a gel at a gelation temperature above said mixing temperature; and
   particles of a thermoplastic substance which dissolves in said thermosetting substance at a temperature between said mixing temperature and said gelation temperature, said thermoplastic substance being a single-phase substantially homogeneous polymer blend of thermoplastic components:
   (i) a thermoplastic polymer with a glass transition temperature of at least about 250° C., and
   (ii) a thermoplastic polymer with a fracture toughness of at least about 2.5 ksi $\sqrt{in}$ and a glass transition temperature of less than about 240° C.

2. A curable resin in accordance with claim 1 in which thermoplastic component (i) has a glass transition temperature of at least about 280° C.

3. A curable resin in accordance with claim 1 in which thermoplastic component (i) has a glass transition temperature of at least about 300° C.

4. A curable resin in accordance with claim 1 in which thermoplastic component (ii) has a toughness of at least about 2.75 ksi $\sqrt{in}$.

5. A curable resin in accordance with claim 1 in which thermoplastic component (ii) has a glass transition temperature of less than about 220° C.

6. A curable resin in accordance with claim 1 in which thermoplastic component (i) is a poly(imide).

7. A curable resin in accordance with claim 1 in which thermoplastic component (ii) is a poly(ether-imide).

8. A curable resin in accordance with claim 1 in which thermoplastic component (i) is a poly(imide) and thermoplastic component (ii) is a poly(ether-imide).

9. A curable resin in accordance with claim 8 in which the weight ratio of thermoplastic component (i) to thermoplastic component (ii) in said mixture is from about 0.3:1 to about 3:1.

10. A curable resin in accordance with claim 8 in which the weight ratio of thermoplastic component (i) to thermoplastic component (ii) in said mixture is from about 0.5:1 to about 2:1.

11. A curable resin in accordance with claim 8 in which thermoplastic component (i) has a glass transition temperature of at least about 300° C., and thermoplastic component (ii) has a glass transition temperature of at most about 220° C.

12. A curable resin in accordance with claim 8 in which thermoplastic component (i) is a poly(benzophenoneimide).

13. A curable resin in accordance with claim 8 in which thermoplastic components (i) and (ii) are both reaction products of an aromatic diamine compound and a bis-1,3-isobenzofurandione compound.

14. A curable resin in accordance with claim 8 in which thermoplastic component (i) is the reaction product of benzophenonetetracarboxylic dianhydride and a diamine.

15. A curable resin in accordance with claim 8 in which thermoplastic component (i) is a reaction product of a di(aminophenyl) compound and a bis-1,3-isobenzofurandione compound.

16. A curable resin in accordance with claim 15 in which said di(aminophenyl) compound is a compound having the formula

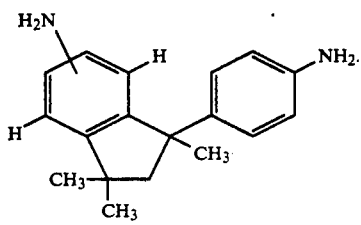

17. A curable resin in accordance with claim 15 in which said bis-1,3-isobenzofurandione compound is a compound having the formula

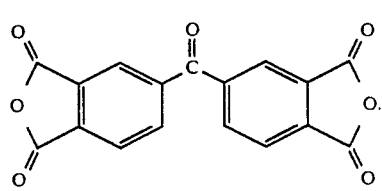

18. A curable resin in accordance with claim 15 in which said di(aminophenyl) compound is a compound having the formula

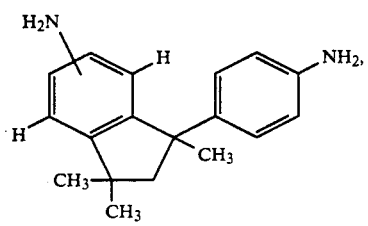

and said bis-1,3-isobenzofurandione compound is a compound having the formula

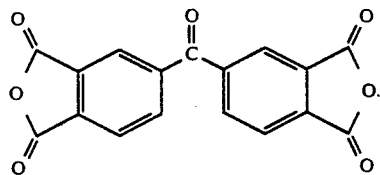

19. A curable resin in accordance with claim 8 in which thermoplastic component (ii) is the reaction product of a diaminobenzene and a dianhydride ether.

20. A curable resin in accordance with claim 8 in which thermoplastic component (ii) is the reaction product of a diaminobenzene and a dianhydride diether.

21. A curable resin in accordance with claim 8 in which thermoplastic component (ii) is the reaction product of a diaminobenzene and a bis-1,3-isobenzofurandione ether.

22. A curable resin in accordance with claim 8 in which thermoplastic component (ii) is the reaction product of a diaminobenzene and a bis-1,3-isobenzofurandione diether.

23. A curable resin in accordance with claim 22 in which said bis-1,3-isobenzofurandione diether is a compound having the formula

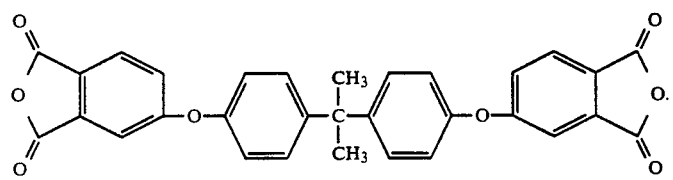

24. A curable resin in accordance with claim 8 in which thermoplastic component (ii) is the reaction product of meta-diaminobenzene and a bis-1,3-isobenzofurandione diether of the formula

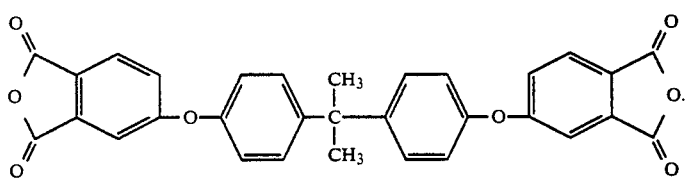

25. A curable resin in accordance with claim 1 in which said thermosetting reactants include a bismaleimide.

26. A curable resin in accordance with claim 1 in which said thermosetting reactants include a bismaleimide and an additional unsaturated organic compound.

27. A curable resin in accordance with claim 1 in which said thermosetting reactants include a bismaleimide and an unsaturated organic compound containing multiple unsaturations.

28. A curable resin in accordance with claim 1 in which said thermosetting reactants include a bismaleimide and an alkenylphenol.

29. A curable resin in accordance with claim 1 in which said thermosetting reactants include a bismaleimide and a bis(alkenylphenol).

30. A curable resin in accordance with claim 1 in which said thermosetting reactants include 4,4'-bismaleimidodiphenylmethane.

31. A curable resin in accordance with claim 8 in which thermoplastic component (i) is a reaction product of a compound having the formula

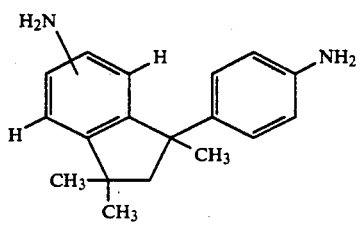

and a compound having the formula

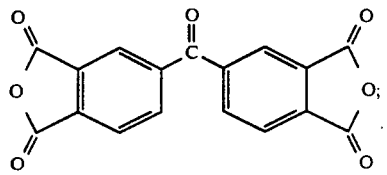

thermoplastic component (ii) is a reaction product of a diaminobenzene and a compound of the formula

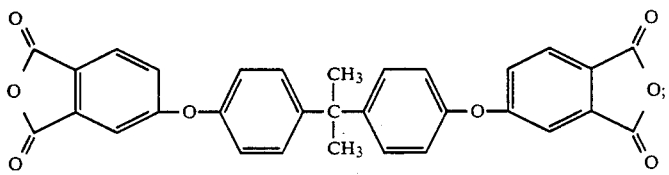

and said thermosetting reactants include 4,4'-bis-maleimidodiphenylmethane and o,o'-diallyl bisphenol A.

32. A fiber-resin composite comprising a fiber matrix impregnated with a solid resin material comprising a dispersed phase and a continuous phase:
one of said dispersed and continuous phases being rich in a thermoset substance formed from a thermosetting substance formed by combining thermosetting reactants at a mixing temperature, which thermosetting substance forms a gel at a gelation temperature above said mixing temperature; and
the other of said dispersed and continuous phases being rich in a thermoplastic substance which dissolves in said thermosetting substance at a temperature between said mixing temperature and said gelation temperature, said thermoplastic substance being a single-phase substantially homogeneous polymer blend of thermoplastic components:
(i) a thermoplastic polymer with a glass transition temperature of at least about 250° C., and
(ii) a thermoplastic polymer with a fracture toughness of at least about 2.5 ksi √in and a glass transition temperature of less than about 240° C.

33. A fiber-resin composite in accordance with claim 32 in which thermoplastic component (i) has a glass transition temperature of at least about 280° C., and thermoplastic component (ii) has a toughness of at least about 2.75 ksi √in and a glass transition temperature of less than about 220° C.

34. A fiber-resin composite in accordance with claim 32 in which thermoplastic component (i) is a poly(imide) and thermoplastic component (ii) is a poly(etherimide).

35. A fiber-resin composite in accordance with claim 34 in which the weight ratio of thermoplastic component (i) to thermoplastic component (ii) in said mixture is from about 0.3:1 to about 3:1.

36. A fiber-resin composite in accordance with claim 34 in which thermoplastic component (i) has a glass transition temperature of at least about 300° C., and said thermoplastic component (ii) has a glass transition temperature of at most about 220° C.

37. A fiber-resin composite in accordance with claim 34 in which thermoplastic component (i) is a poly(benzophenone-imide).

38. A fiber-resin composite in accordance with claim 32 in which thermoplastic component (i) and (ii) are both reaction products of an aromatic diamine compound and a bis-1,3-isobenzofurandione compound.

39. A fiber-resin composite in accordance with claim 34 in which thermoplastic component (i) is a reaction product of a compound having the formula

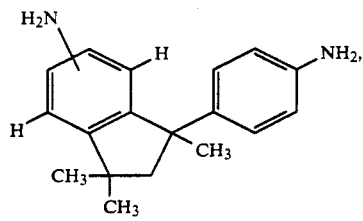

and a compound having the formula

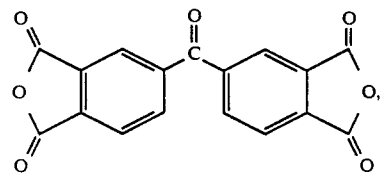

and thermoplastic component (ii) is a reaction product of a diaminobenzene and a compound having the formula

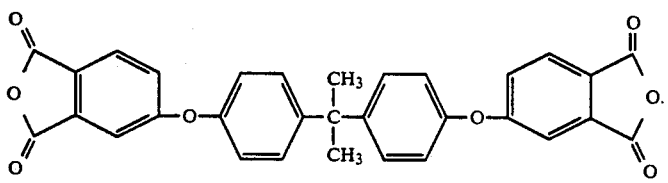

40. A fiber-resin composite in accordance with claim 32 in which said thermosetting reactants include a bismaleimide.

41. A fiber-resin composite in accordance with claim 32 in which said thermosetting reactants include a bismaleimide and an additional unsaturated organic compound.

42. A fiber-resin composite in accordance with claim 32 in which said thermosetting reactants include a bismaleimide and an unsaturated organic compound containing multiple unsaturations.

43. A fiber-resin composite in accordance with claim 32 in which said thermosetting reactants include a bismaleimide and an alkenylphenol.

44. A fiber-resin composite in accordance with claim 32 in which said thermosetting reactants include a bismaleimide and a bis(alkenylphenol).

45. A fiber-resin composite in accordance with claim 32 in which said thermosetting reactants include 4,4'-bismaleimidodiphenylmethane.

46. A fiber-resin composite in accordance with claim 34 in which thermoplastic component (i) is a reaction product of a compound having the formula

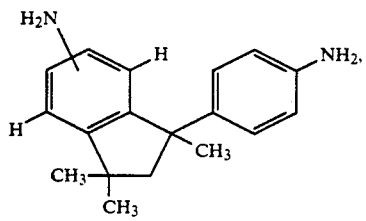

and a compound having the formula

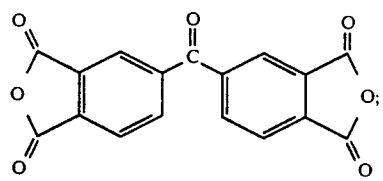

thermoplastic component (ii) is a reaction product of a diaminobenzene and a compound having the formula

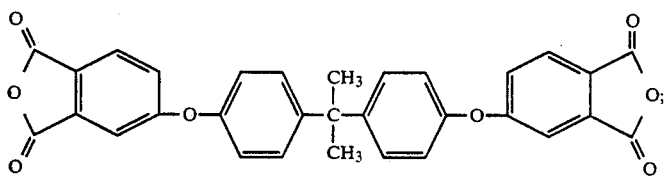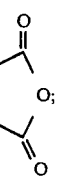

and said thermosetting reactants include 4,4'-bismaleimidodiphenylmethane and o,o'-diallyl bisphenol A.

47. A process for the preparation of a fiber-resin composite, comprising:

(a) combining thermosetting reactants at a mixing temperature to form a thermosetting substance which forms a gel at a gelation temperature above said mixing temperature;

(b) dispersing solid particles through said thermosetting substance to form a dispersion, said solid particles being of a thermoplastic material which dissolves in said thermosetting substance at a temperature between said mixing temperature and said gelation temperature, said thermoplastic substance being a single-phase substantially homogeneous polymer blend of thermoplastic components:

(i) a thermoplastic polymer with a glass transition temperature of at least about 250° C., and (ii) a thermoplastic polymer with a fracture toughness of at least about 2.5 ksi $\sqrt{\text{in}}$ and a glass transition temperature of less than about 240° C.

(c) impregnating a fiber matrix with said dispersion to form a composite;

(d) curing said thermosetting substance in said composite; and (e) cooling said composite to ambient temperature.

48. A process in accordance with claim 47 in which thermoplastic component (i) has a glass transition temperature of at least about 280° C., and thermoplastic component (ii) has a toughness of at least about 2.75 ksi $\sqrt{\text{in}}$ and a glass transition temperature of less than about 220° C.

49. A process in accordance with claim 47 in which thermoplastic component (i) is a poly(imide) and thermoplastic component (ii) is a poly(ether-imide).

50. A process in accordance with claim 49 in which the weight ratio of thermoplastic component (i) to thermoplastic component (ii) in said mixture is from about 0.3:1 to about 3:1.

51. A process in accordance with claim 49 in which thermoplastic component (i) has a glass transition temperature of at least about 300° C., and thermoplastic component (ii) has a glass transition temperature of at most about 220° C.

52. A process in accordance with claim 49 in which thermoplastic component (i) is a poly(benzophenone-imide).

53. A process in accordance with claim 49 in which thermoplastic components (i) and (ii) are both reaction products of an aromatic diamine compound and a bis-1,3-isobenzofurandione compound.

54. A process in accordance with claim 49 in which thermoplastic component (i) is a reaction product of a compound having the formula

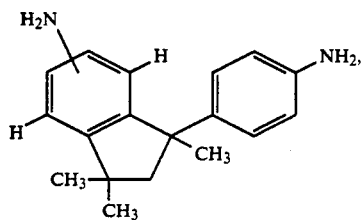

and a compound having the formula

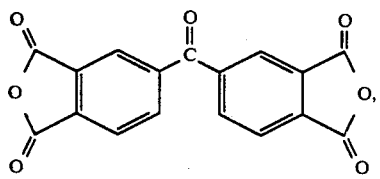

and thermoplastic component (ii) is a reaction product of a diaminobenzene and a compound having the formula

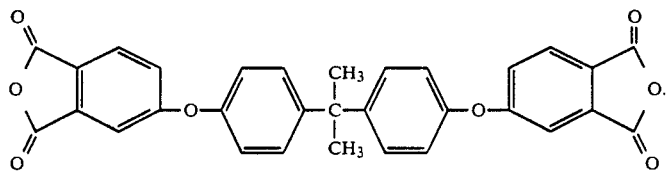

55. A process in accordance with claim 47 in which said thermosetting reactants include a bismaleimide.

56. A process in accordance with claim 47 in which said thermosetting reactants include a bismaleimide and an additional unsaturated organic compound.

57. A process in accordance with claim 47 in which said thermosetting reactants include a bismaleimide and an unsaturated organic compound containing multiple unsaturations.

58. A process in accordance with claim 47 in which said thermosetting reactants include a bismaleimide and an alkenylphenol.

59. A process in accordance with claim 47 in which said thermosetting reactants include a bismaleimide and a bis(alkenylphenol).

60. A process in accordance with claim 47 in which said thermosetting reactants include 4,4'-bis-maleimidodiphenylmethane.

61. A process in accordance with claim 49 in which said thermoplastic component (i) is a reactant product of a compound having the formula

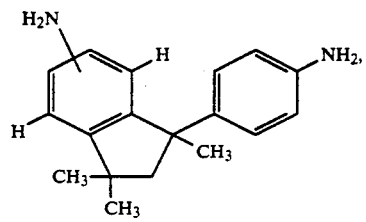

and a compound having the formula

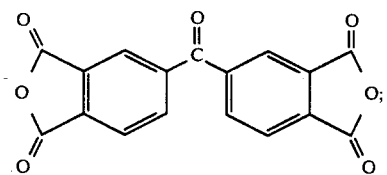

thermoplastic component (ii) is a reaction product of a diaminobenzene and a compound having the formula

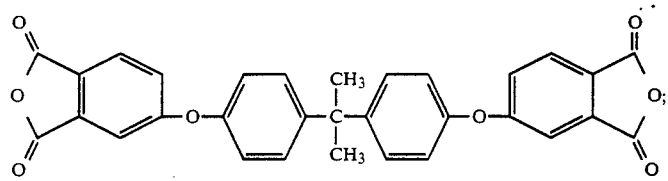

and said thermosetting reactants include 4,4'-bis-maleimidodiphenylmethane and o,o'-diallyl bisphenol A.

* * * * *